United States Patent Office 3,227,702
Patented Jan. 4, 1966

3,227,702
POLYMERIZATION CATALYSTS
Percy Arthur Small, Welwyn Garden City, and Hugh Wilma Boulton Reed, Norton-on-Tees, England, assignors to Imperial Chemical Industries Limited, London, England, a corporation of Great Britain
No Drawing. Filed Oct. 31, 1960, Ser. No. 65,944
Claims priority, application Great Britain, Feb. 27, 1957, 6,549/57
17 Claims. (Cl. 260—94.9)

This invention relates to polymerization catalysts and is a continuation in part of U.S. Serial No. 716,034 filed February 19, 1958, now abandoned.

We have found that there exists a class of silicon compounds containing as an essential feature at least one silicon atom in the molecule directly bonded to one atom of hydrogen, which will react with a transition metal compound to give a polymerization catalyst.

The other groups or atoms bonded to the silicon atom at most only modify the activity per mole of Si—H groups if they are groups of relatively low chemical reactivity such as groups —R or —OR where —R is a hydrocarbon group which may be straight or branched. The activity per mole of Si—H groups is similarly at most only modified if the silicon atom is joined either directly or through an oxygen atom, to one or more other silicon atoms.

Accordingly the present invention provides a process for the polymerization including copolymerization with each other and copolymerization with acetylene of compounds containing a vinyl group and selected from the class consisting of hydrocarbons and chlorine-substituted hydrocarbons by bringing them into contact with polymerization catalysts which are products of reaction of at least one compound of a transition metal as hereinafter defined with at least one compound containing at least one group HSi← where the residual valencies shown are satisfied by groups selected from the class consisting of —R, —Si←—OR and —OSi← groups and combinations thereof where R is a hydrocarbon group and where the residual valencies on the said groups and combinations of groups are satisfied by groups selected from the class consisting of —R and —OR groups. The said transition metals are metals occupying any of the 4th to 10th places after the inert gases in one of the long periods of the periodic system of elements as set out on page 25 of Fritz Ephraim's "Textbook of Inorganic Chemistry" (English edition, Ed. P. C. L. Thorne, pub. Gurney and Jackson, London, 1934), it being understood that the rare earths occupy only one place in the periodic system, that is, a third place after an inert gas.

It is clear that the number of compounds which can be prepared containing the active H—Si grouping and other less active or inactive groups mentioned above is unlimited; there is, however, no practical advantage in diluting the activity of the silicon compound by having a preponderance of the said less active or inactive groups or in unduly complicating the preparation of the silicon compound.

For the same reasons there is no advantage in using as substituents hydrocarbon groups having more than about nine carbon atoms. Very highly polymerized or crosslinked rubbery or glass-like silicon compounds are equally undesirable since in such compounds the accessibility of the reducing groups to the transition metal compound may be greatly lowered, and the removal of catalyst residues from the resulting polymer greatly impeded.

We find that very satisfactory results are obtained by using
(1) Compounds having the formula

where X, Y and Z are slected from —R groups and —OR groups where —R denotes alkyl, alkenyl, cycloalkyl, aryl, alkaryl, aralkyl and aralkenyl groups containing from one to nine carbon atoms.

(2) Alkyl hydrogen silicone oils, for example methyl hydrogen silicone oil having the formula

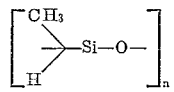

by which formula we include both the cyclic oligomers and the linear polymers, and the corresponding ethyl hydrogen silicone oil.

(3) Siloxene, which has the empirical formula

but those skilled in the art will have no difficulty in selecting many obvious chemical equivalents of these within the broad scope of the statement of invention. Those we have mentioned specifically, however, are preferred for their ease of preparation as well as for their effectiveness.

Transition metals which are preferred are titanium, zirconium, vanadium, chromium, molybdenum, tungsten, iron, cobalt and nickel.

As examples of HSi← compounds for use in the process of this invention we may mention trimethyl silane, triethyl silane, triisopropyl silane, tributyl and isobutyl silanes, dimethyl phenyl silane, methyl diphenyl silane, triphenyl silane, tritolyl silane, trixylyl silane, triallyl silane, ethyl dittolyl silane, ethyl dicyclohexyl silane, methyl diethoxy silane, methyldibutoxy silane, ethyl diphenoxy silane, triethoxy silane, cinnamyl dimethyl silane, methyl hydrogen silicone oil, ethyl hydrogen silicone oil and siloxene.

Transition metal compounds which may be used are for example halides and oxyhalides, alkoxides and acetylacetonates. They may be used in the form of complexes with nitrogenous or oxygenated compounds e.g. amines and ethers if a less active catalyst is desired.

Our preferred transition metal compounds are halides, particularly chlorides, bromides and iodides, and we find that the process of this invention is most easily conducted when these compounds are compounds of metals which occupy either the 4th, 5th or 6th places after the inert gases in one of the long periods of the periodic system and these compounds are preferably compounds of titanium, the choice of compound depending upon the nature of the polymer which it is desired to produce.

The process of this invention is particularly useful for polymerizing purely hydrocarbon monomers and chlorine-substituted hydrocarbon monomers having the formula $CH_2=CHR$ where R is selected from the class consisting of hydrogen, alkyl radicals, α-alkenyl radicals, α-chlorovinyl radicals, aryl radicals and chlorine atoms. Thus aliphatic mono-α-olefines, e.g. ethylene, propylene, butene-1, 3-methyl-butene-1 and 4-methyl-pentene-1, conjugated dienes e.g. butadiene, isoprene and chloroprene, styrene, substituted styrenes and vinyl chloride may be polymerized or copolymerized by the process of this invention. They may also be copolymerized with acetylene.

To polymerize ethylene TiCl₄ is our preferred transition metal compound because of its activity, relative availability and the ease with which it may be handled, as it is both volatile and soluble in petroleum ether; to polymerize propylene to an isotactic polymer crystalline $TiCl_3$ is preferred in conjunction with a trialkyl silane as the catalysts of this invention then result in highly crystalline polypropylene.

We find that the ratio in which the silicon compound and the transition metal compound are reacted together has an important effect upon the molecular weight of polymer produced using the catalysts of this invention or an important effect on the nature of the polymer so produced. Thus, to obtain a polymer of particular molecular weight, crystallinity or rubberiness (depending upon the monomer polymerized), the ratio of silicon compound to transition metal compound to be used should be varied to determine ratios to provide polymers of particular desired properties.

We prefer that the process of our invention is conducted in the presence of sufficient liquid medium, e.g. added hydrocarbon and/or unreacted liquid monomer, so that, at the end of the polymerization, the polymer formed (when this is a solid insoluble in the liquid medium used) is a slurry rather than a solid and intractable mass, and, for this reason, we prefer to work so that the ratio of liquid medium (at the end of the reaction) to solid polymer is between 2:1 and 7:1, preferably 2:1 and 4:1, this ratio being (volume of liquid medium in ml.)/(weight of solid polymer in g.). The hydrocarbon medium used is preferably one which is free from sulphur-containing impurities as best polymerization yields are obtained with a hydrocarbon solvent free from sulphur-containing impurities. The catalysts used in the process of this invention are most easily prepared in the presence of a solvent during the polymerization reaction.

It will be appreciated that many of the transition metal compounds suitable for use in the process of this invention are not soluble in hydrocarbon solvents. An important example of such compounds is $TiCl_3$. With such compounds the process of this invention can be expedited, and yields in polymerization processes with our catalysts improved, by milling, e.g. ball milling the ingredients together, the silicon compound being preferably dissolved in a hydrocarbon solvent. When the process is conducted in this way it is preferred that the size of the $TiCl_3$ particles is not reduced to colloidal size, as the particularly useful effects obtained by $TiCl_3$ are thereby destroyed.

As some of the catalysts and silicon components of the catalysts used in the process of this invention are decomposed by oxygen or humidity, the process of this invention should be conducted in the absence of air or moisture or in the presence of only limited amounts of them.

In view of the reactive nature and colour of the catalysts used in the process of our invention it is desirable to remove these catalysts from polymeric materials produced with them. The catalysts may be decomposed by treating polymeric materials containing them with an hydroxyl containing compound, e.g. water or steam, or an alcohol, including a dry alcohol, e.g. methanol or butanol. The decomposition products may then be removed by washing the polymeric materials with for example methanol, an acid or alkaline medium as is appropriate. When insoluble residues resulting from catalyst formation then remain in the polymer, the polymer may be further purified by dissolving it in a suitable solvent, e.g. xylene at a temperature of about 120° C. for polyethylene, separating the insoluble material by filtration or centrifuging and recovering the polymer by, for example, cooling the solution, adding a precipitant or spray drying.

The following examples serve to illustrate our invention. Our invention is, however, in no way limited by these examples.

EXAMPLE 1

0.04 gm. mol triethyl silane were mixed with 0.04 gm. mol titanium tetrachloride when dissolved in 300 mls. petroleum ether of 120° C. boiling point in a 1,400 mls. capacity (stirred) autoclave from which oxygen had been removed by flushing with dry oxygen-free nitrogen. Ethylene was supplied to raise the pressure in the autoclave to 51 atmospheres at 24° C. The temperature was raised to 130° C. This temperature was maintained for 15 hours, the maximum pressure in the autoclave being 120 atmospheres. The solid reaction product was shredded and extracted, first with methanol, then with ethanolic hydrochloric acid and finally methanol again. After drying in vacuo at 60° C. for 18 hours 16 gms. of polythene were obtained.

EXAMPLE 2

Petroleum ether having a boiling point of 150° C. was purified by refluxing overnight with anhydrous aluminum chloride, distilling, refluxing overnight with sodium/potassium alloy and distilling again, these operations being conducted in an atmosphere of nitrogen. The purified petroleum ether obtained was stored over sodium/potassium alloy and under an atmosphere of nitrogen. Example 1 was repeated using this purified petroleum ether. When the autoclave temperature had been raised to 80 to 90° C. polymerization started and the temperature rose without further heating to 135° C. The autoclave was then maintained at 110° C. for 16 hours. The maximum pressure in the autoclave was 64 atmospheres. After washing and drying as in Example 1, 51.5 gms. of polymer were obtained.

EXAMPLE 3

4.2 gms. methyl hydrogen silicone oil and 0.06 mol titanium tetrachloride dissolved in 300 mls. petroleum ether of boiling point greater than 120° C. and purified as described in Example 2 were added to a 1,400 ml. capacity autoclave, which was fitted with a stirrer, and from which oxygen had been removed by sweeping with nitrogen. Ethylene was supplied to the autoclave to raise the pressure to 51 ats. at 23° C. The autoclave was stirred and held at approximately 130° C. for 16 hours. After washing and drying, as described in Example 1, 212 gms. of solid polyethylene of melt viscosity, at 190° C., greater than $2 \times 10^4$ poises were obtained.

EXAMPLE 4

The process of Example 3 was repeated using 0.06 mol of titanium tetrachloride and 8 gms. of methyl hydrogen silicone oil. 218 gms. solid polymer of ethylene were obtained.

EXAMPLE 5

0.04 mol titanium tetrachloride and 3.2 gms. siloxene and 150 mls. petroleum ether (B.P. greater than 120° C.), purified as described in Example 2, were worked together under an atmosphere of argon in a glass tube containing steel balls, which was rotated for 16 hours. The slurry obtained was diluted with a further 100 mls. purified petroleum ether and was transferred to a 1,400 mls. autoclave which had been flushed with argon. Ethylene was added to raise the pressure to 50 ats. at 20° C. The autoclave was then held at 130° C. for 21 hours. (The maximum pressure shown was 131 ats.) The polymer obtained was treated with ethanolic hydrochloric acid and washed with methanol and dried in vacuo. 61 gms. dry polyethylene were obtained.

Further examples are shown in the form of tables, Table I illustrating polymerization processes with catalysts formed by treating titanium trichloride with dimethyl phenyl silane or methyl diphenyl silane, Table II illustrating polymerization processes with catalysts formed by treating titanium tetrachloride with dimethyl phenyl silane and Table III illustrating polymerization processes with catalysts formed by treating titanium trichloride with trimethyl silane.

Table I

Conditions: 6 hours at 100° C. (except in Examples 8 and 9 for which the temperature was 150° C.) in 1-liter rocking autoclave with 200 mls. 60–80° petrol present. The solid obtained in the reaction was separated by filtration. The petrol was evaporated from the filtrate leaving an oil. The solids were washed with methanolic hydrochloric acid and then with warm ether followed by warm heptane.

Olefine:
P. 350 g. propylene.
E. 50 atoms. ethylene pressure at 20° C.

| Example | $(CH_3)_2PhSiH$, mole | $CH_3Ph_2SiH$, mole | $TiCl_3$, mole | Olefine | Oil, g. | Extracted Solid, g. | Remarks |
|---|---|---|---|---|---|---|---|
| 6 | 0.12 | | 0.06 | P | 18.8 | 2.2 | Oil ash 0.33%. |
| 7 | 0.12 | | 0.06 | P | 9.5 | 1.4 | |
| 8 | 0.12 | | 0.06 | P | 29.7 | | Oil B.P. 190°. |
| 9 | 0.12 | | 0.06 | P | 7.8 | | Oil B.P. 164°. |
| 10 | 0.12 | | 0.06 | E | 2.6 | 7.0 | |
| 11 | 0.12 | | 0.06 | E | 10.3 | 1.7 | |
| 12 | | 0.12 | 0.06 | P | 16.6 | | Oil B.P. >200°. |
| 13 | | 0.12 | 0.06 | P | 9.1 | | |

If Examples 6 to 11 are repeated using dimethyl benzyl silane or dimethyl cinnamyl silane in place of the dimethyl phenyl silane or if Examples 12 and 13 are repeated using ethyl ditolyl silane or methyl dicyclohexyl silane in place of the methyl diphenyl silane, similar results will be obtained.

Table II

[Conditions as for Table I]

| Example | $(CH_3)_2PhSiH$, mole | $TiCl_4$, mole | Olefine | Oil, g. | Solid, g. |
|---|---|---|---|---|---|
| 14 | 0.12 | 0.06 | P | 6.5 | |
| 15 | 0.12 | 0.06 | P | 39.0 | |
| 16 | 0.12 | 0.06 | E | | 170 |
| 17 | 0.12 | 0.06 | E | | 103 |

The oil from Example 15, on fractionation, gave the following fractions:

| B.P. | Volume, mls. | $N_D^{20}$ | Bromine Number |
|---|---|---|---|
| 80.0° | 5.0 | 1.3878 | |
| 94.9° | 5.0 | 1.3979 | |
| 100.6° | 5.0 | 1.4052 | 1.3 |
| 106.8° | 5.0 | 1.4109 | 1.7 |
| 113.0° | 5.0 | 1.4093 | 1.9 |
| 116.5° | 5.0 | 1.4064 | 1.6 |
| 118.4° | 5.0 | 1.4049 | 1.2 |
| 195.0° | 5.0 | 1.4222 | |

Table III

[Conditions: 1-liter rocking autoclave, 250 mls. petrol, 350 g. propylene for 6 hours]

| Example | $(CH_3)_3SiH$, moles | $TiCl_3$, moles | Ratio | Temp., ° C. | Solid Polymer, g. | Remarks |
|---|---|---|---|---|---|---|
| 18 | 0.16 | 0.08 | 2/1 | 100 | 9 | 91% solid polymer insoluble in ether. |
| 19 | 0.16 | 0.08 | 2/1 | 100 | 2 | |
| 20 | 0.27 | 0.08 | 3.4/1 | 100 | 3 | |

EXAMPLE 21

Methyl hydrogen silicone oil (1.5 gms.) was mixed with titanium tetrachloride (2.7 ml., 0.025 M), dissolved in methyl cyclohexane (100 mls.) and charged into a small autoclave. Ethylene was then supplied and the stirred mixture heated for 18 hours at 130–135° C. The maximum pressure was 89 atmospheres. After washing and drying as in Example 1, 42.7 gms. polymer were obtained.

EXAMPLE 22

Methyl hydrogen silicone oil (10 gms.) and titanium tetrachloride (9.2 mls.; 0.084 M) dissolved together in petroleum ether (250 mls. B.P.>120° C.) and kept under reflux overnight. The cooled dark-brown slurry was transferred to a large autoclave, vinyl chloride (200 ml.) added and heated with stirring at 70° C. for 20 hours. The maximum pressure was 20.5 atmospheres. The product was washed with alcohol, boiled with ethanolic hydrochloric acid, then with ethanol and finally acetone, to give 18.2 gms. solid product. Of this product 25% was soluble in tetrahydorfuran.

EXAMPLE 23

Methyl hydrogen silicone oil (2.00 gms.), $CrCl_3$ (4.75 gms.; 0.03 M) were ball milled together in petroleum ether (50 mls., B.P. >120° C.) for 16 hours and the slurry charged to an autoclave with more petroleum ether (50 mls.). Ethylene added at 20° C. to raise the pressure to 50 ats., when the stirred autoclave was heated at 150° C. for 13 hours. 3.15 gms. solid product were obtained (58% ash).

EXAMPLE 24

Methyl hydrogen silicone oil (1.5 gms.), $VCl_4$ (2.7 mls.; 0.025 M) in petroleum ether (100 mls., BP >120° C.) were charged to a small autoclave. Stirred mixture was heated at 130° C. for 14 hours with ethylene (maximum pressure=96 ats.). 3.3 gms. solid polyethylene were obtained having crystalline M.P. 124–30° C. and melt viscosity $6.55 \times 10^7$ poises (1.3% ash).

EXAMPLE 25

Methyl hydrogen silicone oil (1.5 gms.), $TiCL_4$ (2.7 mls.; 0.025 M) in sodium-dry toluene (100 mls.) heated at 128° C. for 18 hours with ethylene (maximum pressure=96 ats.) 16.7 gms. solid polyethylene were obtained of crystalline M.P. 121–6° C. (0.9% ash).

EXAMPLE 26

1.7 g. methyl hydrogen silicone oil were added to a suspension of 10.5 g. titanium tetraiodide in 500 mls. of dry benzene in a stirred autoclave of 2 liters capacity. 300 mls. of butadiene were added and the autoclave was heated to 120–130° C. and maintained at this temperature for 13 hours. After cooling, the polymer was precipitated by addition of methanol, separated and dried to give 30 gms. of a viscous polymer of reduced viscosity .065 for a 1% solution in benzene at 25° C. Its infra-red spectrum indicated that is contained 23% 1:2, 48% trans-1:4, and 29% cis-1:4 linkages.

EXAMPLE 27

350 mls. of isoprene were added to a mixture of 21.2 g. titanium tetrabromide, 7.2 g. methyl hydrogen silicone oil and 500 mls. benzene in stirred autoclave of 2 liters capacity and heated at 120–130° C. during 16 hours. The solid product was isolated as described in Example 26.

EXAMPLE 28

6 g. methyldiethoxysilane, 15 ml. of a .1% solution of cobalt chloride/pyridine complex in chlorobenzene and 500 mls. of chlorobenzene were introduced into a stirred autoclave of 2 liters capacity. 200 ml. of butadiene were added and the mixture was heated at 80° C. for 12 hours. The solid product was isolated as in Example 26. If this experiment is repeated using methyl dibutoxy silane (8.7 g.) ethyl diphenoxy silane (11 g.) or triethoxy silane (7.4 g.) instead of the methyldiethoxy silane, similar results will be obtained.

EXAMPLE 29

5.8 g. titanium tetrachloride, 8.0 g. methyldiethoxy silane and 300 mls. petroleum ether of B.P. 100–120° C. were introduced into a stirred autoclave of 1 liter capacity. A mixture of 90% ethylene and 10% acetylene was added to raise the pressure to 50 atmospheres, and the autoclave was then heated to 115–120° C. for 13 hours. After cooling the solid unsaturated copolymer produced was precipitated with methanol, filtered off, washed with methanol and dried.

EXAMPLE 30

250 g. butene-1 were copolymerized with 50 g. 4-methylpentene-1 in presence of 0.12 mole triphenyl silane and .06 mole titanium trichloride according to the method of Example 6. The product consisted of 31.5 g. of an oil.

If this experiment is repeated with tricresyl or trixylyl silane instead of triphenyl silane similar results will be obtained.

EXAMPLE 31

1.7 g. methyl hydrogen silicone oil were added to a solution of 3.1 g. vandium oxychloride in 500 mls. dry benzene in an autoclave of 2 liters capacity and 300 mls. chloroprene were added. The mixture was heated at 130° C. for 16 hours. The solid product obtained was isolated as in Example 26.

If ethyl hydrogen silicone oil is used instead of methyl hydrogen silicone oil, similar results will be obtained.

EXAMPLES 32–38

.06 mole of the transition metal compound was added to a solution of 7.2 g. methyl hydrogen silicone oil in 300 mls. pure dry petroleum ether of B.P. 100–120° C. in a stirred autoclave of 1400 ml. capacity, which was fitted with a stirrer and from which the air had been displaced by nitrogen. Ethylene was added to raise the pressure to 50 atm., and the autoclave was heated to 120° C. and stirred at this temperature for 12 hours. The polythene formed was isolated as described in Example 1.

| Example | Transition Metal Compound | Yield, g. |
|---|---|---|
| 32 | TiCl$_4$ | 141 |
| 33 | ZrCl$_4$ | 63 |
| 34 | Chromium Acetylacetonate | 27 |
| 35 | Tetrabutyl titanate | 41 |
| 36 | MoCl$_5$ | 127 |
| 37 | WBr$_6$ | 73 |
| 38 | VCl$_4$ | 104 |

We claim:
1. A process for the polymerization of a compound containing a vinyl group in which a compound containing a vinyl group having up to eight carbon atoms and selected from the class consisting of hydrocarbons and chlorine-substituted hydrocarbons containing only one chlorine atom is brought into contact with a polymerization cataylst which is the product of reaction of at least one silicon compound containing at least one group H—Si← where the residual valencies shown are satisfied by groups selected from the class consisting of —R, —Si←, —OR and —O—Si← groups and combinations thereof, where R is a hydrocarbon group and where the residual valencies on the said groups and combinations of groups are satisfied by groups selected from the class consisting of —R and —OR groups, and at least one compound of a transition metal occupying any of the 4th to 10th places after the inert gases in one of the long periods of the periodic system of elements, it being understood that the rare earth metals occupy one place therein, said transition metal compound being a halide.

2. A process according to claim 1 in which said transition metal compound is a chloride.

3. A process according to claim 1 in which said transition metal is a metal occupying any of the 4th to 6th places after the inert gases in one of the long periods of the periodic system of elements.

4. A process according to claim 3 in which said transition metal is titanium.

5. A process according to claim 1 conducted in the presence of a hydrocarbon medium.

6. A process according to claim 5 in which said hydrocarbon medium is free from sulphur containing impurities.

7. A process according to claim 5 in which the ratio of liquid medium at the end of reaction to solid polymer is between 2:1 and 7:1, this ratio being (volume of liquid medium in milliliters) to (weight of solid polymer in grams).

8. A process according to claim 7 in which the ratio of liquid medium at the end of reaction to solid polymer is between 2:1 and 4:1, this ratio being (volume of liquid medium in milliliters) to (weight of solid polymer in grams).

9. A process according to claim 1 in which the polymerizable compound is ethylene.

10. A process according to claim 9 in which said transition metal compound is TiCl$_4$.

11. A process for polymerizing propylene according to claim 1 in which said silicon compound is a trialkyl silane and said transition metal compound is crystalline TiCl$_3$.

12. A process according to claim 11 in which the particle size of the TiCl$_3$ is reduced by milling, preferably ball milling, reduction to particles of colloidal size being avoided.

13. A process according to claim 11 in which said silane is (CH$_3$)$_3$SiH.

14. A process according to claim 1 in which catalyst residues are extracted from the polymer produced.

15. A process according to claim 1 in which the silicon compound is an alkyl hydrogen silicone oil.

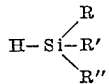

16. A process according to claim 1 in which the silicon compound has the formula
wherein R, R' and R" are hydrocarbon groups.

17. A catalyst system for the polymerization of normally gaseous alpha-monoolefins consisting essentially of (1) titanium chloride and (2) methyl hydrogen polysiloxane.

References Cited by the Examiner
UNITED STATES PATENTS 2,938,000  5/1960  Wanless _____ 252—429
2,974,133  3/1961  Wilberg et al. _____ 260—94.9

FOREIGN PATENTS 569,387  1/1959  Belgium.
576,018  8/1959  Belgium.
573,649  12/1958  Belgium.

JOSEPH L. SCHOFER, Primary Examiner.

L. H. GASTON, MORRIS LIEBMAN, Examiners.